United States Patent [19]

Tagami et al.

[11] Patent Number: 5,291,237
[45] Date of Patent: Mar. 1, 1994

[54] FLASH SYNCHRONIZING DEVICE

[75] Inventors: Shigeru Tagami; Tomihiko Aoyama; Teruyo Hayakawa; Hiroshi Yamazaki; Yuji Nakajima; Seiichi Imano, all of Yotsukaido, Japan

[73] Assignee: Seikosha Co., Ltd., Tokyo, Japan

[21] Appl. No.: 874,285

[22] Filed: Apr. 24, 1992

[30] Foreign Application Priority Data

Apr. 25, 1991 [JP] Japan .................... 3-029142[U]

[51] Int. Cl.$^5$ .................. G03B 15/03; G03B 7/08
[52] U.S. Cl. ........................ 354/413; 354/129; 354/435; 354/441; 354/446
[58] Field of Search .......... 354/129, 435, 441, 446, 354/412, 420, 423, 422, 416, 413

[56] References Cited

U.S. PATENT DOCUMENTS

| | | | |
|---|---|---|---|
| 4,415,248 | 11/1983 | Suzuki et al. | 354/423 |
| 4,469,989 | 9/1984 | Takematsu | 315/241 P |
| 4,478,502 | 10/1984 | Nakai | 354/416 |
| 4,603,954 | 8/1986 | Egawa et al. | 354/137 |
| 4,779,115 | 10/1988 | Fujino et al. | 354/422 |
| 4,806,963 | 2/1989 | Kobayashi et al. | |
| 4,897,684 | 1/1990 | Serikawa | 354/416 |
| 5,144,359 | 9/1992 | Hayashi et al. | 354/420 X |

Primary Examiner—Michael L. Gellner
Assistant Examiner—Jae N. Noh
Attorney, Agent, or Firm—Jordan and Hamburg

[57] ABSTRACT

A camera has a shutter which may also constitute a diaphragm. In a multi7flash mode the shutter selectively has a maximum aperture at an onset or at the end of the time base. The flash occurs in synchronism with a shutter waveform shaped by this aperture area and a time base element. In a second embodiment, a second diaphragm setting circuit is provided, in diaphragm priority photography, for computing a measurement value of a distance to a subject and a second diaphragm value from the guide number during an emission of flashed light. The diaphragm is set to the computed second diaphragm value, ad an electronic flash is energized with a desired aperture area. The diaphragm is set to an initial value to effect the photography at a time other than during the emission of flashed light. A timing circuit may be provided for setting the diaphragm to the second diaphragm value. The aperture area may be increased or decreased for diaphragm matching with the quantity of flashed light and the distance to the subject during diaphragm priority flash photography.

15 Claims, 7 Drawing Sheets

FLASH SYNCHRONIZING DEVICE

FIELD OF THE INVENTION

This invention relates generally to a flash synchronizing device. One embodiment of the invention is directed more particularly to the provision of a flash synchronizing device, in a camera with a multi-flash function, in which one of flashes is synchronized with the maximum value of the diaphragm. In another embodiment of the invention, a subject is properly irradiated with the flashed light when effecting diaphragm priority photographing.

BACKGROUND OF THE INVENTION

Generally, when a flash synchronizing device is provided in a camera with a multi-flash function, a constant amount of light from the flash is emitted a plurality of times, in synchronization with shutter operations. The plurality of light emissions are effected at substantially equal intervals with respect to the time base, and are independent of the size of the aperture area of the shutter. For this reason, an average flash effect is obtained. The exposure quantity is the same for all portions of the picture, however, resulting in such drawbacks that vividness is not apparent in the photographed picture, and the photo is hard to see.

Elements for determining an exposure for taking a photo are the film sensitivity, the shutter speed, the diaphragm and the brightness of a subject. If the film sensitivity and the brightness of the subject are determined, a proper exposure value can be determined. Automatic exposure (AE) control is effected by setting the shutter speed and the diaphragm value so that a proper exposure C has an exposure value based on the subject luminance E, a film ASA sensitivity S, a diaphragm value F and an exposure time T.

Under AE control, the selection by the camera of the shutter speed, the diaphragm, or all the elements depends upon the purpose of the photograph. When subjects are selected for which the depth of field must be enhanced, e.g., still-life photography, group photography (the depth of focus is needed) and a portrait (the background is out of focus while decreasing the depth), diaphragm priority AE is preferable. If the photographer sets the diaphragm value, or if, alternatively the diaphragm value is determined from a result of measuring the distance to the subject, the shutter speed is automatically set.

On the other hand, a flashmatic mechanism in which the camera interlocks with the electronic flash is a mechanism for controlling, when irradiation distance varies, the diaphragm value interlocking therewith on the basis of GN (guide number) =F·D expressed as a product of a diaphragm value indicating a light quantity of the flash and the irradiation distance D (to the subject).

For controlling the proper exposure by interlocking the flash with AE of the camera, the guide number of the flash is set, and thereafter the diaphragm is automatically adjusted simply by adjusting the distance.

The above-described flashmatic mechanism includes an auto-flashmatic mechanism constructed to emit no light when the natural light suffices for an exposure quantity of the subject but automatically emit the light under such conditions that a blur would otherwise caused due to an ambient darkness.

When the photographer selects diaphragm priority photography under auto exposure control including the flashmatic mechanism, and if a constant guide number is set, it follows that the photographing distance is restricted by the selected diaphragm. A quantity of transmitted light which corresponds to the subject distance is not controlled, resulting in a photo with an improper exposure quantity in some cases.

Further, it is impossible to select an emission timing of emitted light.

SUMMARY OF THE INVENTION

It is an object of the present invention to overcome the above-described drawbacks, and to provide a flash synchronizing device capable of obtaining a vivid photo by providing a maximum diaphragm value synchronizing flash means for synchronization with the maximum diaphragm value, and enhancing an image of a subject when photographing a moving subject by the multi-flash.

To accomplish this object, according to the present invention, a flash synchronizing device is provided comprised of a shutter serving as a diaphragm, a multi-flash means for effecting a plurality of flashes during a period from a start of exposure of the shutter to the end thereof, and a maximum diaphragm value synchronizing flash means by which one of the flashes synchronizing with the diaphragm values by the multi-flash means is synchronized with the maximum diaphragm value.

It is a further object of the invention to provide a flash synchronizing device capable of effecting proper flash photography corresponding to the distance from the flash to a subject even when performing diaphragm priority photography, further selecting an emission timing of the flashed light and taking photos exhibiting different effects.

In order to accomplish this latter object, according to the present invention, a flash synchronizing device comprises a photometric means for measuring a brightness of a subject, a focusing means for measuring the distance to the subject, an exposure quantity setting means for setting an exposure quantity from a diaphragm value obtained by the photometric means or a diaphragm value predetermined by the photographer, and a flash control means for operating an electronic flash. A second diaphragm setting means is provided for computing a second diaphragm value from the distance measured by the focusing means and from a light quantity of the electronic flash and further outputting the second diaphragm value to the exposure quantity setting means and by operating the flash control means in synchronization with the second diaphragm value.

The diaphragm value is selected by the photographer or by the exposure setting means as an exposure quantity from a subject brightness measured by the photometric means. If the exposure quantity set by the exposure setting means is sufficient by comparing it with a predetermined exposure quantity needed for the subject, a shutter driving means for releasing the shutter is operated. In the event of an underexposure, the exposure setting means operates the second diaphragm setting means for computing the second diaphragm value from the guide number of the electronic flash and the subject distance measured by the focusing means. The diaphragm is set to the second diaphragm value computed by the second diaphragm setting means. The electronic flash is flashed by the flash control means. The light is emitted from the electronic flash in synchronization with a timing at which the shutter is released to open the aperture; or the aperture is closed after an exposure time has elapsed. The diaphragm is returned to the diaphragm value set by the exposure setting means during an exposure time for which no light is emitted from the electronic flash. For this reason, even if diaphragm priority photography is being used and when the subject is irradiated with the flashed light, an image with a proper exposure quantity is obtained by securing the diaphragm value corresponding to the photographing distance.

BRIEF DESCRIPTION OF THE DRAWINGS

In order that the invention may be more clearly understood, it will now be disclosed in greater detail with reference to the accompanying drawing, wherein.

DETAILED DISCLOSURE OF THE INVENTION

Figure 1:
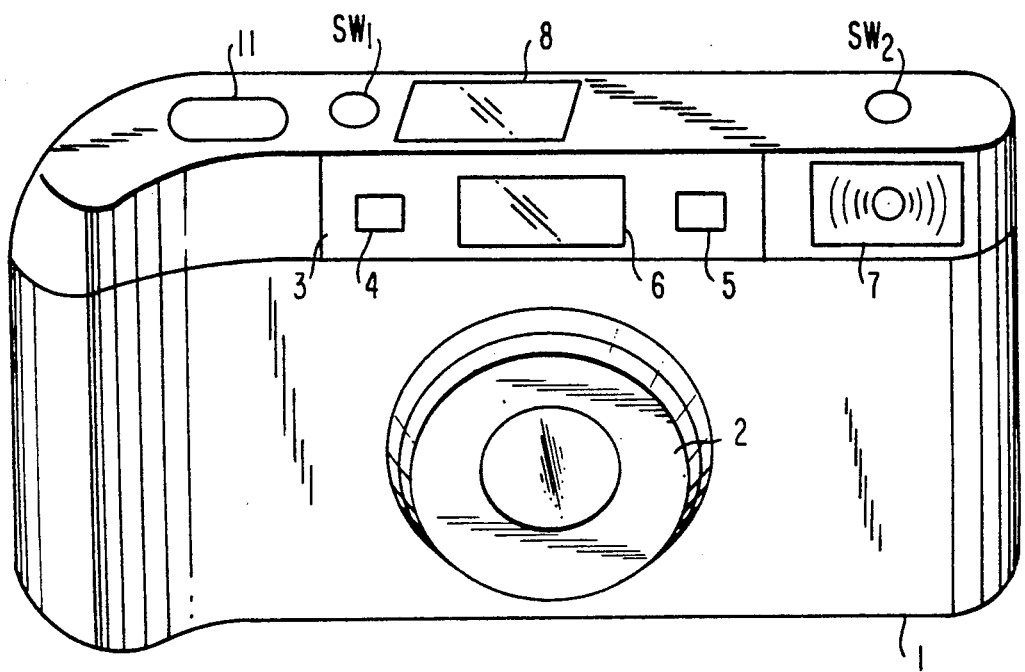
FIG. 1 is a perspective view showing one embodiment of a flash synchronizing device according to the present invention.

One embodiment of a flash synchronizing device according to the present invention will hereinafter be described in detail with reference to FIGS. 1-5. In the flash synchronizing device of this invention, as illustrated in FIG. 1, a multiflash selecting switch $SW_2$ is mounted on an upper surface of a body 1 incorporating a multi-flash function. Further, in addition to the multiflash selecting switch $SW_2$, a liquid crystal display unit 8, a release button 11 and a program selecting switch $SW_1$ are mounted on the upper surface of the body. An AF unit 3 comprising a light receiving module 5 and a light emitting module 4, a finder 6 and an electronic flash 7, are provided on the front surface of the body 1. The body 1 is also equipped with a lens barrel 2.

Figure 2:
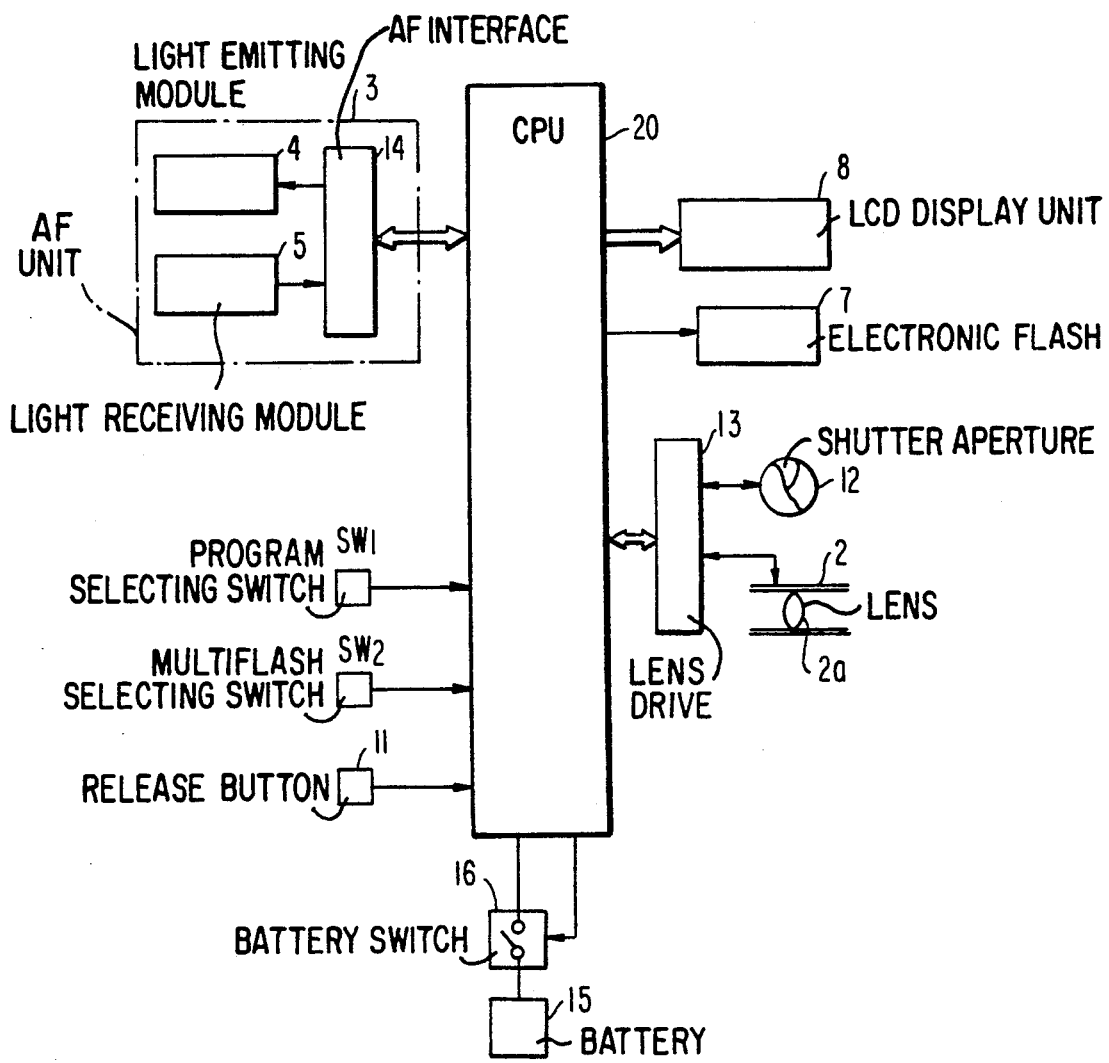
FIG. 2 is a block diagram showing one embodiment of the flash synchronizing device according to the present invention.

The light receiving module 5 and the light emitting module 4 of the AF unit 3 are, as depicted in FIG. 2, connected to a CPU 20 via an AF interface 14 incorporating an A/D converting function and an electrooptical converting function. The program selecting switch $SW_1$ and the multi-flash selecting switch $SW_2$ are also connected to the CPU 20. When the program selecting switch $SW_1$ is depressed with a light touch, a shutter speed priority mode, a diaphragm priority mode and an optimum exposure combination mode are sequentially selected under the program control. The selected program control is displayed on the liquid crystal display unit 8. When the multi-flash selecting switch $SW_2$ is depressed with a light touch, a single flash mode, a #1 multi-flash mode and a #2 multi-flash mode are sequentially selected. The selected positions are displayed on the liquid crystal display unit 8. The #1 multi-flash mode is a mode in which the flash is synchronized with a program AE such that an aperture area comes to the maximum at an initial time, while the #2 multi-flash mode is a mode in which the flash is synchronized with a program AE such that the aperture area comes to the maximum at an end of the time base.

The release button 11 connected to the CPU 20 serves as a 2-step operation switch. A battery switch 16 is closed by a one-step operation with the result that a battery 15 is connected to the CPU 20. When the battery 15 is connected to the CPU 20, photometric and focusing operations are effected by an optical unit in the light receiving module 5 and the light emitting module 4 of the AF unit 3. An arithmetic circuit in the CPU 20 computes photometric and focusing data. The CPU 20 controls the shutter aperture 12 and a lens 2a of the lens barrel 2 through a shutter lens drive 13 on the basis of the arithmetic results.

The CPU 20 further incorporates a maximum diaphragm value synchronizing flash program by which the synchronizing flash takes place at the start or end of the photographing. When executing the maximum diaphragm value synchronizing flash program, a proper exposure is produced due to flashing at such a position that the aperture area of the shutter is large; and an underexposure is effected when the light is flashed at other times since the aperture area is smaller at such other times.

Figure 3:
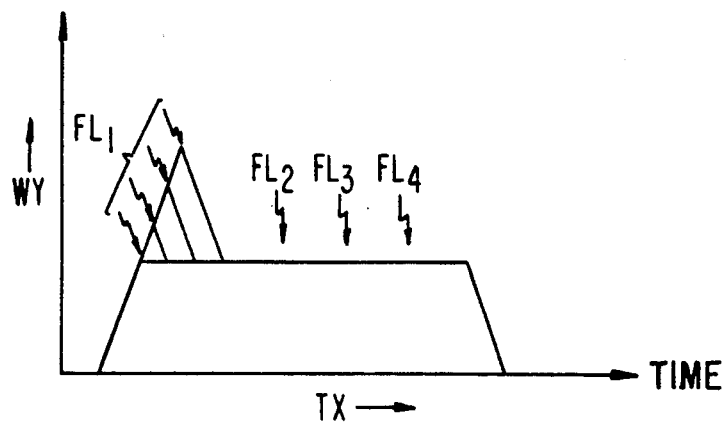
FIG. 3 is a characteristic diagram of the flash synchronizing device of this invention.

In the flash synchronizing device described above, when manipulating the multi-flash selecting switch $SW_2$ illustrated in FIGS. 1 and 2 with a light touch and half-depressing the release button 11 after selectively setting switch $SW_2$ in the #2 multi-flash mode, the display unit 8 displays an indication of commencing a shutter opening/closing operation wherein aperture area is maximized at the end of the time base. Subsequently, when fully depressing the release button 11, the electronic flash 7 flashes in synchronism with the shutter opening/closing operation. Upon flashing of the electronic flash 7, irradiation of luminous fluxes $FL_1$-$FL_4$ illustrated in FIG. 4 take place in synchronization with the shutter waveforms shaped by a time base TX of the X axis and a shutter aperture area WY of the Y axis. For this reason, in a photographed picture, as depicted in FIG. 5, the optimum flash is developed in the traveling direction of a moving subject, thereby enhancing the luminous flux $FL_4$. The luminous fluxes $FL_1$, $FL_2$, $FL_3$ are subjected to underexposure. Further, When enhancing a first image of the moving subject in the traveling direction, the position of the multi-flash selecting switch SW2 is selectively set to a #1 multi-flash position. FIG. 3 illustrates the shutter waveform in this case.

The flash synchronizing device according to the present invention is comprised of a shutter serving as a diaphragm, a multi-flash means for effecting a plurality of flashes during a period from a start of exposure of the shutter capable of controlling a plurality of diaphragm values to the end thereof, and a maximum diaphragm value synchronizing flash means by which one of flashes synchronized with the diaphragm values by the multi-flash means is synchronized with the maximum diaphragm value among a series of diaphragm values of the shutter. As a consequence, a vivid photo is advantageously obtained with enhanced images when photographing the moving subject by the multi-flash.

Figure 4:
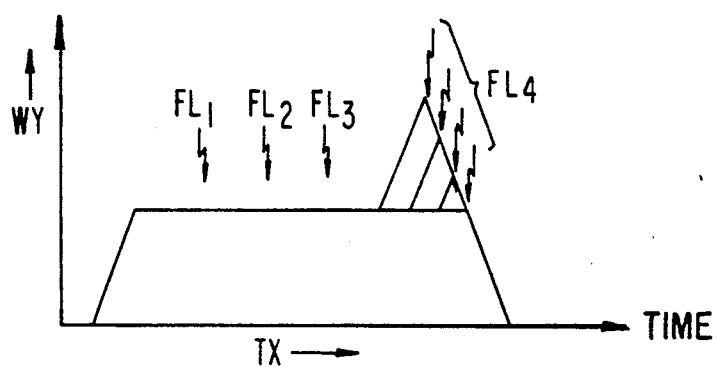
FIG. 4 is a characteristic diagram of the flash synchronizing device of this invention.
Figure 5:
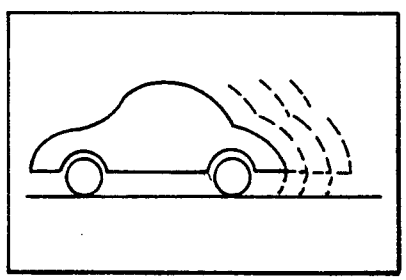
FIG. 5 is a block diagram illustrating a picture photographed by the flash synchronizing device of this invention.

In the above described system, in a #2 multi-flash mode, when an electronic flash depicted in FIGS. 1 and 2 flashes, irradiation of luminous fluxes $FL_1$–$FL_4$ illustrated in FIG. 4 occurs in synchronism with shutter waveforms shaped by a time base TX of the X axis and a shutter aperture area WY of the Y axis. For this reason, in a photographed picture, as depicted in FIG. 5, the optimum flash is developed in the traveling direction of a moving subject, thereby enhancing the luminous flux $FL_4$. The luminous fluxes $FL_1$, $FL_2$, $FL_3$ are subjected to underexposure. In order to enhance the last picture of the moving subject in the traveling direction, the position of a multi-flash selecting switch SW2 is selectively set to a #2 multi-flash position. FIG. 4 illustrates a shutter waveform in this case. Further, in order to enhance the first image of the moving subject in the traveling direction, the position of the multi-flash selecting switch $SW_2$ is selectively set to a #1 multi-flash position. FIG. 3 illustrates the shutter waveform in this case.

Figure 6:
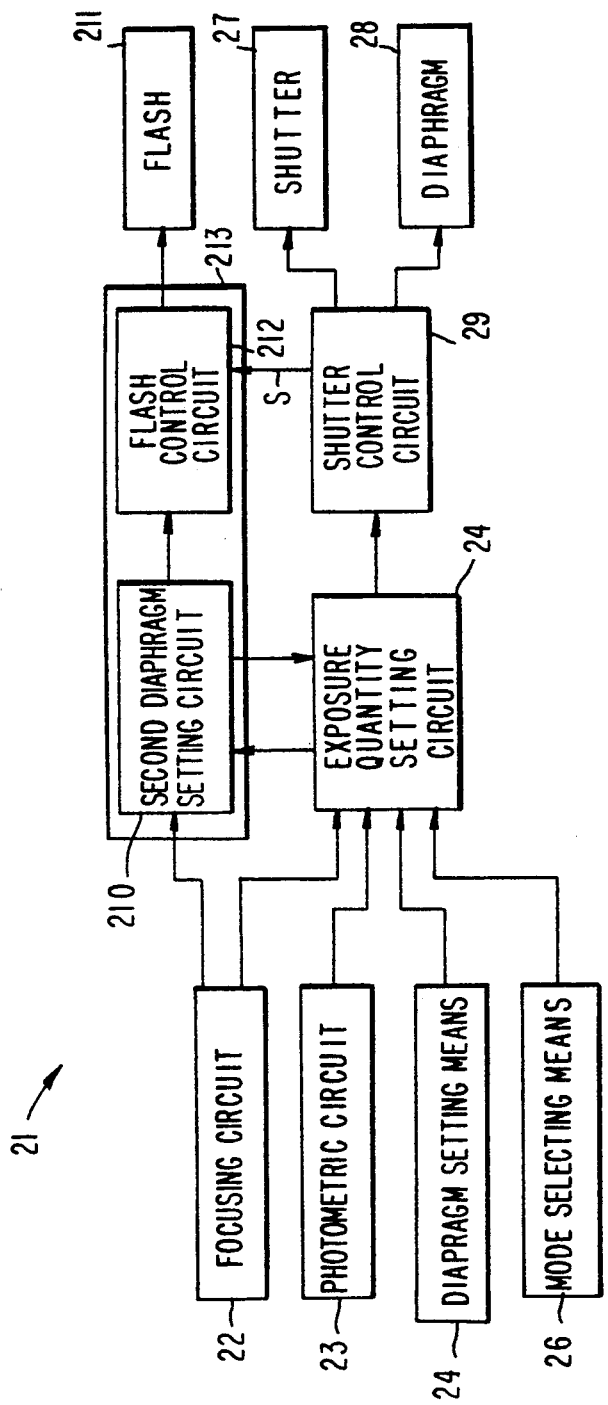
FIG. 6 is a block diagram showing another embodiment of the invention, in which a flash synchronizing device is employed.

Referring now to the block diagram of FIG. 6, a camera 21 for effecting diaphragm priority photographing includes a light receiving module (not illustrated having light receiving elements PSD for receiving reflected light which has been emitted towards a subject. The camera is also provided with a focusing circuit 22 defined as a focusing means for measuring the distance to the subject from the light information received by the light receiving module. The camera 21 is further provided with a photometric circuit 23 defined as a photometric means for measuring a brightness of the subject from the light information received by photometric elements SPD, and with an exposure quantity setting circuit 24 defined as an exposure quantity setting means to which the brightness of the subject are inputted together with the information relating to the distance to the subject, of the focusing circuit 22. The exposure quantity setting circuit 24 computes an exposure time by inputting diaphragm information of a mode selecting means 26 for selecting diaphragm photographing or a diaphragm value set by a manual diaphragm setting means 25 from the exposure quantity together with an exposure index, etc. as a film characteristic inputted further thereto. The system further comprises shutter control circuit 29, defined as a shutter control means for operating a shutter 27 and a diaphragm 28 by transmitting a drive signal in the event of an exposure quantity appropriate to photographing of the subject from the arithmetically obtained exposure time. The camera 21 also includes a flash synchronizing device 213 comprised of a second diaphragm setting circuit 210 controlled by the exposure quantity setting circuit 24 in order to effect flash photographing in the event of an underexposure for the exposure time obtained by the exposure quantity setting circuit 24 and of a flash control circuit 212 defined as a flash control means for inputting a synchronizing light emitting signal S from the shutter control circuit 29. The second diaphragm setting circuit 210 inputs the distance to the subject from the focusing circuit 22 and thereby computes a second diaphragm value F2 from a guide number. The second diaphragm value F2 computed by the second diaphragm setting circuit 210 is inputted to the exposure quantity setting circuit 24, whereby the diaphragm 28 is set to the second diaphragm value F2 by the shutter control circuit 29. Then in response to the synchronizing light emitting signal S, the flash control circuit 212 induces an emission of light by an electronic flash (hereinafter referred to as a flash) 211 including a xenon discharge tube. When effecting diaphragm priority photography by the use of the thus fabricated camera 21, the light receiving module receives the light with which the subject is irradiated. The focusing circuit 22 thereby obtains the distance to the subject, while the photometric circuit 23 obtains the brightness of the subject. When the photographer manually sets the diaphragm 28, the information from the diaphragm setting means 25 is inputted to the exposure quantity setting circuit 24 together with the distance to the subject and the brightness thereof. Alternatively, when selecting diaphragm priority photography, the information from the mode selecting means 26 may be inputted to the circuit 24. The exposure quantity setting circuit 24 sets the exposure time from the exposure quantity as well as from the diaphragm value. If the exposure quantity predetermined from the brightness of the subject is sufficient, the shutter control circuit 29 sets the diaphragm 28 to a set value to provide a desired aperture area, whereby the exposure quantity setting circuit 24 operates the shutter 28 at such a time as to obtain a proper exposure quantity. In the case of an underexposure, the exposure quantity setting circuit 24 operates the flash control circuit 212 by an output of the photometric circuit 23, thus effecting flash photography.

Figure 7:
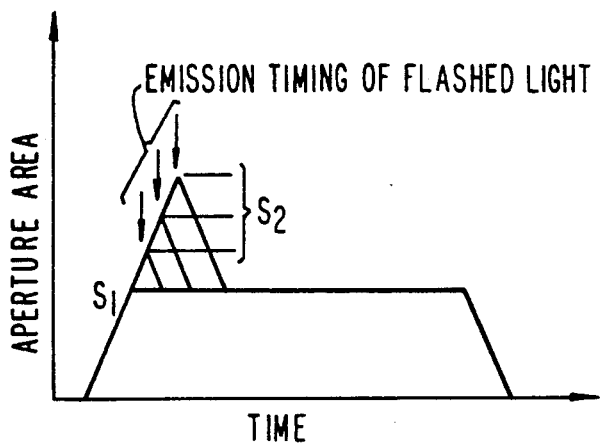
FIG. 7 is a diagram showing a relation between an emission timing of flashed light and an aperture area in accordance with the embodiment shown in FIG. 6.
Figure 8:
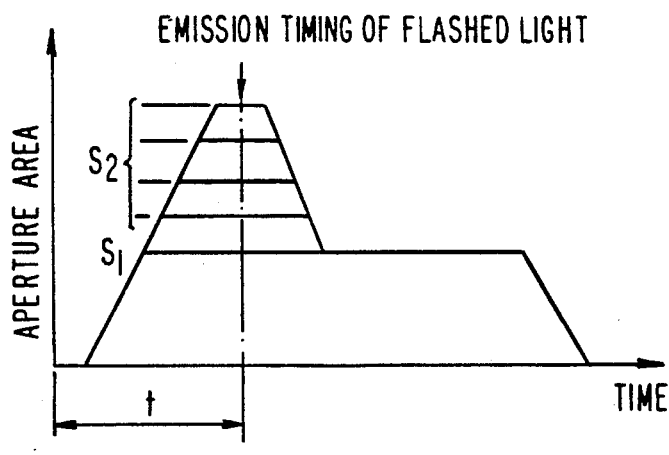
FIG. 8 is a diagram showing a relation between the emission timing of flashed light and the aperture area in accordance with the embodiment shown in FIG. 6.

When effecting flash photography, the second diaphragm setting circuit 210 inputs a subject distance D measured by the focusing circuit 22 in response to the drive signal of the exposure quantity setting circuit 24, thereby obtaining a second diaphragm value F2 from the guide number. Immediately, the diaphragm 28 is changed from the diaphragm value FI manually set or arithmetically set by the exposure quantity setting circuit 24 to the second diaphragm value F2 through the shutter control circuit 29, thus changing the aperture area. The synchronizing light emitting signal S is output to the flash control circuit 212. As illustrated in FIG. 7, if the quantity of the flashed light is insufficient with the set diaphragm value F1, the aperture area is expanded from S1 to S2, resulting in a large aperture. When reaching the desired aperture area S2, the flash 11 is flashed, and the aperture area is again contracted from S2 down to S1. The diaphragm value is returned to F1, and the flash photography is controlled by a triangular waveform. Further, as depicted in FIG. 8, the aperture area is expanded from S1 to S2, and after a desired time has elapsed, the light is emitted from the discharge tube of the flash 211. The flash photography may be controlled by a trapezoidal waveform to return the diaphragm value to F1.

Figure 9:
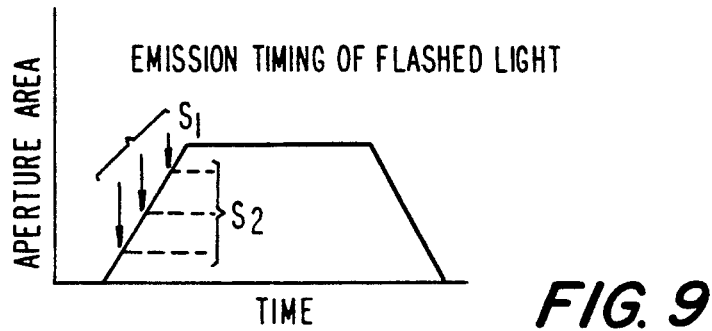
FIG. 9 is a diagram showing a relation between the emission timing of flashed light and the aperture area in accordance with the embodiment shown in FIG. 6.
Figure 10:
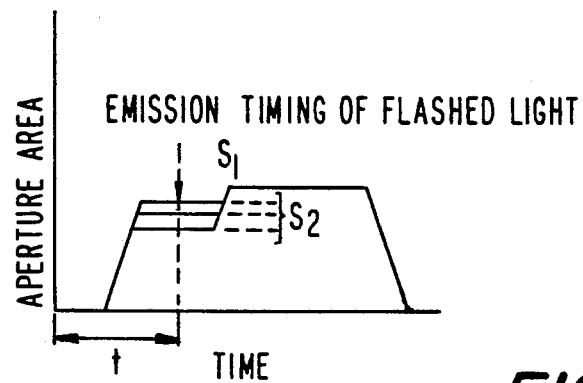
FIG. 10 is a diagram showing a relation between the emission timing of flashed light and the aperture area in accordance with the embodiment shown in FIG. 6.

If the quantity of flashed light is over that required for the set diaphragm value F1, and when the subject is close in the event of counter-light, as illustrated in FIG. 9, the diaphragm 28 is set to the diaphragm value F1 by the shutter control circuit 29, and the aperture area is set thereby to S1. Upon reaching the aperture area S2—i.e., a small aperture—corresponding to the diaphragm value F2 in the course of this process, the flash 211 is energized. Subsequently, the diaphragm value is set to F1 by changing the aperture area from S2 to S1. Further, as illustrated in FIG. 10, setting of the aperture area is ended with S2 corresponding to the second diaphragm value F2 After the desired time t has passed, the light is emitted from the flash 211. The aperture area is set to S1 corresponding to the diaphragm value F1, whereby the flash photography may be controlled by the trapezoidal waveform.

Figure 11:
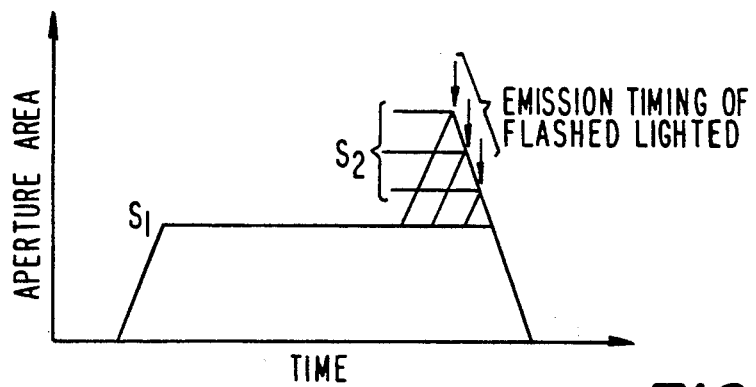
FIG. 11 is a diagram showing a relation between the emission timing of flashed light and the aperture area in accordance with the embodiment shown in FIG. 6.
Figure 12:
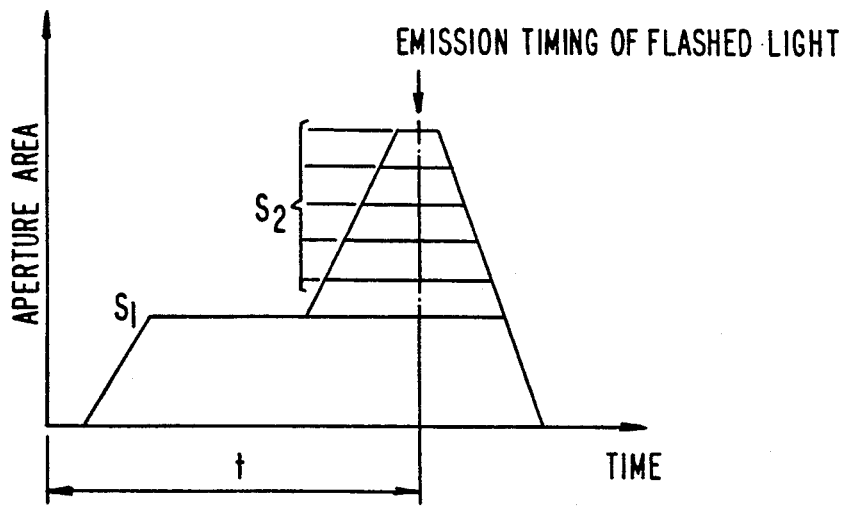
FIG. 12 is a diagram showing a relation between the emission timing of flashed light and the aperture area in accordance with the embodiment shown in FIG. 6.
Figure 13:
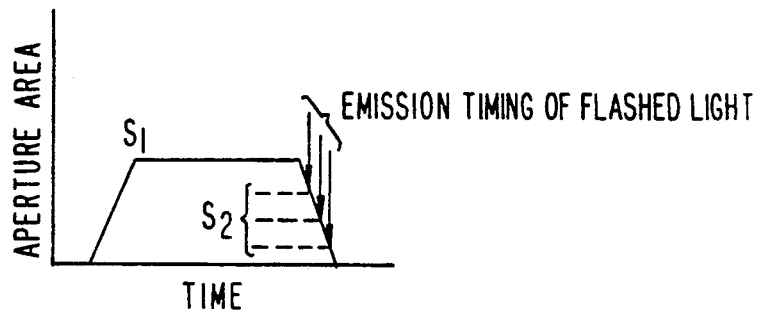
FIG. 13 is a diagram showing a relation between the emission timing of flashed light and the aperture area in accordance with the embodiment shown in FIG. 6.
Figure 14:
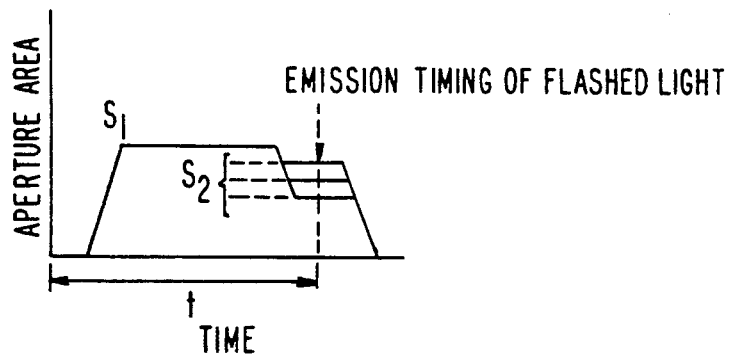
FIG. 14 is a diagram showing a relation between the emission timing of flashed light and the aperture area in accordance with the embodiment shown in FIG. 6.

The second diaphragm setting circuit 210 may include a timing circuit by which the diaphragm 28 can be set to the second diaphragm value F2 at a desired time. Further, as illustrated in FIG. 11, the aperture area is expanded from S1 to S2 to obtain the second diaphragm value F2 in the latter period of exposure, and that is controlled by the triangular waveform. When the desired aperture area S2 is thus reached, the flash 211 can be energized. Alternatively, as shown in FIG. 12, the aperture area is expanded from S1 to S2 to obtain the second diaphragm value F2 in the latter period of exposure, and that is controlled by the trapezoidal waveform. After the desired time it has elapsed, the flash photographing can be also effected in accordance with the timing circuit for causing an emission of light from the flash 211. In the case of an over-exposure exposure caused by the flashed light, as illustrated in FIG. 13, similarly the aperture area is diminished from S1 down to S2 to obtain the second diaphragm value F2 in the latter period of exposure. The flash 211 is energized when the desired aperture area S2 is attained. Alternatively, as depicted in FIG. 14, the aperture area is diminished from S1 down to S2 to obtain the second diaphragm value F2 in the latter period of exposure, and that is controlled by the trapezoidal waveform. After the desired time t has passed, the flash photography can be also performed in accordance with the timing circuit for causing the emission of light from the flash 211.

In a embodiment discussed above, the shutter and a diaphragm are provided, however, the triangular and trapezoidal waveforms may be controlled by constructing the shutter to also serve as the diaphragm.

The invention is not limited to the embodiment described above. Variations based on the concept of the present invention are, accordingly, possible.

As is obvious from the description given above, the flash synchronizing device of the present invention incorporates a second diaphragm setting means for setting to the second diaphragm corresponding to the distance to the subject when emitting the flashed light via the set diaphragm even when effecting diaphragm priority photographing. The flashed light with which the subject is irradiated is emitted in synchronism with the diaphragm value thereof. A photo with a proper exposure can be thereby obtained. In addition, the depth of field becomes a greater because of the diaphragm priority photographing. A photo is obtained in which not only the subject, but also the background, are well focused. Photos exhibiting different effects can be taken by selecting the execution in the early period or in the latter period of the timing exposure time based on the emission of flashed light.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A flash synchronizing device comprising a shutter serving as a diaphragm, a multi-flash means for effecting a plurality of flashes during a period from a start of a single exposure by said shutter to the end thereof, means for setting said diaphragm to a series of different diaphragm values during said period, including a maximum diaphragm value, and a maximum diaphragm value synchronizing flash means for synchronizing one of the flashes of said multi-flash means with the time of occurrence of said maximum diaphragm value of said series during said period, at least one other of said plurality of flashes occurring at a time other than the time of occurrence of said maximum diaphragm value.

2. In a flash synchronizing device comprising a photometric means for measuring a brightness of a subject, a focusing means for measuring the distance to said subject, an exposure quantity setting means for setting an exposure quantity from a first diaphragm value obtained by said photometric means or predetermined by a user, a flash control means for operating an electronic flash a first time during a period from a start of a single exposure by the shutter to the end thereof, the improvement wherein said device further comprises a second diaphragm setting means for computing a second diaphragm value from the distance measured by said focusing means and from a light quantity of said electronic flash and for setting said second diaphragm value during said period, means for outputting the second diaphragm value to said exposure quantity setting means, and means for operating with flash control means a second time in synchronization with the time of occurrence of said second diaphragm value during said period.

3. A flash synchronizing device comprising a shutter serving as a diaphragm, a multi-flash means for effecting a plurality of flashes during a period from a start of a single exposure by said shutter to the end thereof, means for setting said diaphragm to a series of different diaphragm values during said period, including a maximum diaphragm value, and a maximum diaphragm value synchronizing flash means for synchronizing one of the flashes of said multi-flash means with the time of occurrence of said maximum diaphragm value of said series during said period, at least one other of said plurality of flashes occurring at a time other than the time of occurrence of said maximum diaphragm value, said means for setting said diaphragm comprising means for setting said diaphragm to said maximum value at the beginning of said period, whereby said one flash occurs at the beginning of said period.

4. A flash synchronizing device comprising a shutter serving as a diaphragm, a multi-flash means for effecting a plurality of flashes during a period from a start of a single exposure by said shutter to the end thereof, means for setting said diaphragm to a series of different diaphragm values during said period, including a maximum diaphragm value, and a maximum diaphragm value synchronizing flash means for synchronizing one of the flashes of said multi-flash means with the time of occurrence of said maximum diaphragm value of said series during said period, at least one other of said plurality of flashes occurring at a time other than the time of occurrence of said maximum diaphragm value, said means for setting said diaphragm comprising means for setting said diaphragm to said maximum value at the end of said period, whereby said one flash occurs at the end of said period.

5. The flash synchronizing device of claim 2 wherein said means for setting said second diaphragm value comprises means for setting a diaphragm value that is greater than all other diaphragm values during said period.

6. The flash synchronizing device of claim 5 wherein said means for setting said second diaphragm value comprises means for setting said second diaphragm value to occur at the start of said period.

7. The flash synchronizing device of claim 5 wherein said means for setting said second diaphragm value comprises means for setting said second diaphragm value to occur at the end of said period.

8. The flash synchronizing device of claim 2 wherein said means for setting said second diaphragm value comprises means for setting said second diaphragm value to be less than other diaphragm values during said period.

9. In a flash synchronizing device for a camera having a shutter that also serves as a diaphragm, means for opening said shutter and controlling the diaphragm value thereof from the start of an exposure to the end thereof, a flash means, and means for controlling said flash means to produce a flash during said exposure, the improvement wherein said means for opening and controlling said shutter comprises means for controlling the diaphragm value to have a plurality of different values during said exposure, and said means for controlling said flash means comprises means for synchronizing said flash with the occurrence of a predetermined one of said diaphragm values or of a diaphragm value predetermined by a user and means for controlling said flash means to flash at another time during said exposure at which the diaphragm value is different than said predetermined one value.

10. The flash synchronizing device of claim 9 wherein said means for controlling said diaphragm comprises means for setting said predetermined one of said diaphragm values to have a maximum value greater than all other diaphragm values thereof during said exposure.

11. In a flash synchronizing device for a camera having a shutter that also serves as a diaphragm, means for opening said shutter and controlling the diaphragm value thereof from the start of an exposure to the end thereof, a flash means, and means for controlling said flash means to produce a flash during said exposure, the improvement wherein said means for opening and controlling said shuttered comprises means for controlling the diaphragm value to have a plurality of different values during said exposure, and said means for controlling said flash means comprises means for synchronizing said flash with the occurrence of a predetermined one of said diaphragm values or of a diaphragm value predetermined by a user and means for controlling said flash means to flash at another time during said exposure at which the diaphragm value is different than said predetermined one value, said means for controlling said diaphragm comprises means for setting said predetermined one of said diaphragm values to have a maximum value greater than all other diaphragm values thereof during said exposure, said predetermined one of said diaphragm values occurring at the start of said exposure.

12. In a flash synchronizing device for a camera having a shutter that also serves as a diaphragm, means for opening said shutter and controlling the diaphragm value thereof from the start of an exposure to the end thereof, a flash means, and means for controlling said flash means to produce a flash during said exposure, the improvement wherein said means for opening and controlling said shutter comprises means for controlling the diaphragm value to have a plurality of different values during said exposure, and said means for controlling said flash means comprises means for synchronizing said flash with the occurrence of a predetermined one of said diaphragm values or of a diaphragm value predetermined by a user and means for controlling said flash means to flash at another time during said exposure at which the diaphragm value is different than said predetermined one value, said means for controlling said diaphragm comprises means for setting said predetermined one of said diaphragm values to have a maximum value greater than all other diaphragm values thereof during said exposure, said predetermined one of said diaphragm values occurring at the end of said exposure.

13. The flash synchronizing device of claim 9 wherein said camera has a photometric means for measuring brightness of a subject and a focusing means for measuring the distance to said subject, said means for opening and controlling said shutter comprising means for setting said diaphragm to a first diaphragm value during a first part of said exposure, means for setting said diaphragm to a second diaphragm value during another part of said exposure, said second diaphragm value being dependent upon the distance measured by said focusing means or set by a user and the light quantity of said flash means, said means for controlling said flash means comprising means for synchronizing said flash when said diaphragm is set to said second diaphragm value.

14. The flash synchronizing device of claim 13 wherein said first diaphragm value is less than said second diaphragm value.

15. The flash synchronizing device of claim 13 wherein said first diaphragm value is greater than said second diaphragm value.

* * * * *